United States Patent
Pronovost et al.

[15] 3,670,936
[45] June 20, 1972

[54] AUTOMOBILE ACCESSARY HOLDER

[72] Inventors: Charles F. Pronovost, 6429 195 Avenue; Dale L. Prangley, 8407 184th Lane East, both of Sumner, Wash. 98390

[22] Filed: Sept. 30, 1970

[21] Appl. No.: 80,514

[52] U.S. Cl. ..................................................224/42.42
[51] Int. Cl. ..................................................B60r 7/04
[58] Field of Search ............... 206/19.5 R, 19.5 B; 297/237, 297/188; 108/44; 224/42.42 R, 42.11, 29 R

[56] References Cited

UNITED STATES PATENTS

| | | | |
|---|---|---|---|
| 3,561,589 | 2/1971 | Fuller et al. | 206/19.5 R |
| 3,311,276 | 3/1967 | Fromm | 224/42.11 X |
| 3,465,930 | 9/1969 | Croix | 224/42.42 |
| 2,698,155 | 12/1954 | Bowman | 224/42.45 R |
| 3,589,577 | 6/1971 | Basinger | 108/44 |
| 3,371,976 | 3/1968 | Ritz, Jr. | 206/19.5 |

FOREIGN PATENTS OR APPLICATIONS

| | | | |
|---|---|---|---|
| 571,939 | 9/1945 | Great Britain | 206/19.5 R |

*Primary Examiner*—Philip Arnold
*Attorney*—Theron H. Nichols

[57] ABSTRACT

The disclosed automobile accessary holder comprises a flat map case, a padded flashlight holder on each side of the map case, means for mounting radio transmitters, or the like, on one surface of the map case, and arcuate ends formed on lower edges of the map case along with a padded map case bottom for fitting on the transmission shaft tunnel on most automobiles. A very efficient, compact, and sturdy automobile accessary holder is thus formed.

3 Claims, 3 Drawing Figures

PATENTED JUN 20 1972

3,670,936

INVENTORS:
CHARLES F. PRONOVOST
BY DALE L. PRANGLEY

Theron H. Nichols
AGENT

AUTOMOBILE ACCESSARY HOLDER

SUMMARY OF THE INVENTION

An automobile accessory holder is described and illustrated comprising a flat, vertical map case having outwardly curved arcuate ends on the lower ends of the sides of the map case for being secured with a suitable fastening means to the drive shaft tunnel of most any automobile. Flashlight holders, padded internally, are mounted on each side of the map case. On the front surface are adjustable brackets for supporting radio transmitters, or the like, thereon. Padding on the bottom of the map case is optional to ensure a good fit on the various drive shaft tunnels it is designed for.

Accordingly a principal object of this invention is to provide an automobile accessory holder that will fit snugly and securely to the drive shaft tunnel of most automobiles.

Another object of this invention is to provide a holder for mounting on an automobile drive shaft tunnel having means for storing flashlights therein.

A further object of this invention is to provide an automobile accessory holder for mounting on the drive shaft tunnel of an automobile for supporting a radio transmitter on a surface of the holder.

A further object of this invention is to provide a holder for mounting on an automobile drive shaft tunnel having padded means for storing flashlights therein.

A still further object of this invention is to provide an automobile accessory holder having arcuate lower ends for securely mounting the holder to the drive shaft tunnel of most automobiles.

Other objects and various advantages of the disclosed automobile accessory holder will be apparent from the following detailed description, together with the accompanying drawing, submitted for purposes of illustration only.

BRIEF DESCRIPTION OF THE FIGURES

The drawing diagrammatically illustrates by way of example, not by way of limitation, one form of the invention wherein like reference numerals designate corresponding parts in the several views in which.

The invention disclosed herein, the scope of which being defined in the appended claims, is not limited in this application to the details of construction and arrangement of parts shown and described, since the invention is capable of other embodiments and of being practiced or carried out in various other ways. Also, it is to be understood that the phraseology or terminology employed herein is for the purpose of description and not of limitation.

DESCRIPTION OF THE PREFERRED EMBODIMENT

Figure 1:
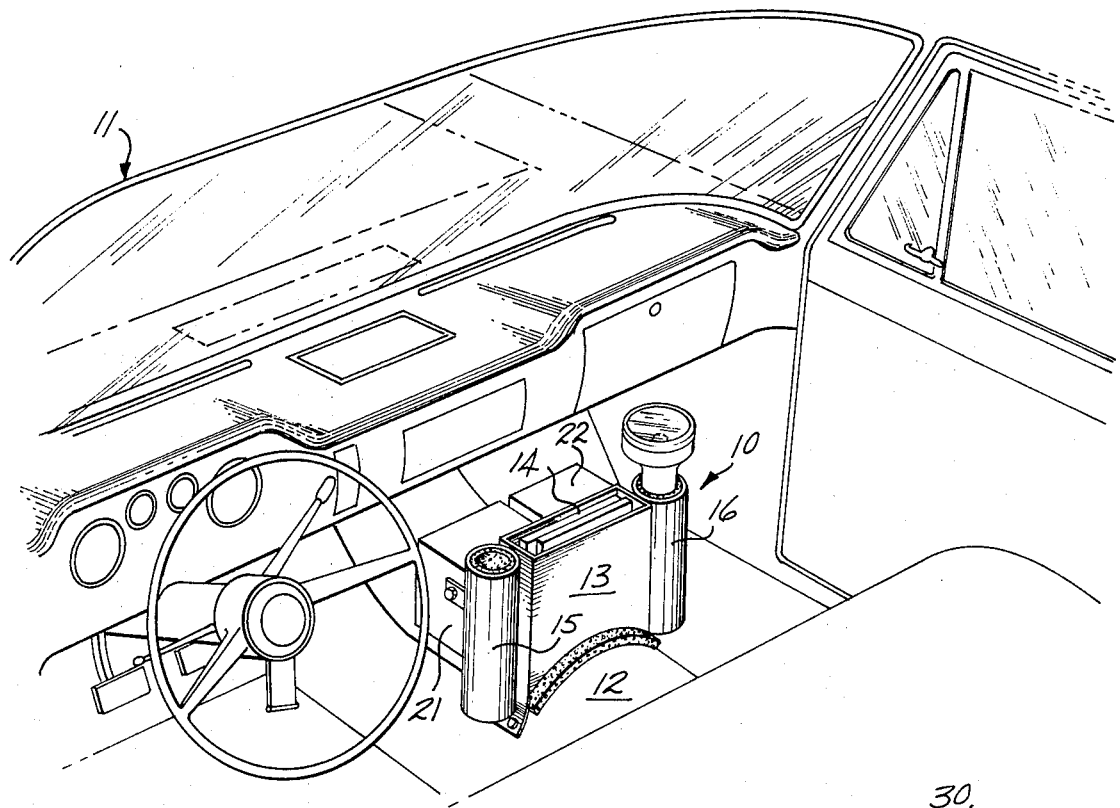
FIG. 1 is a schematic perspective view of the new automobile accessory holder mounted in an automobile.

FIG. 1, anisometric drawing, illustrates the automobile accessory holder 10 mounted over the drive shaft tunnel 12 in a conventional automobile 11.

Figure 2:
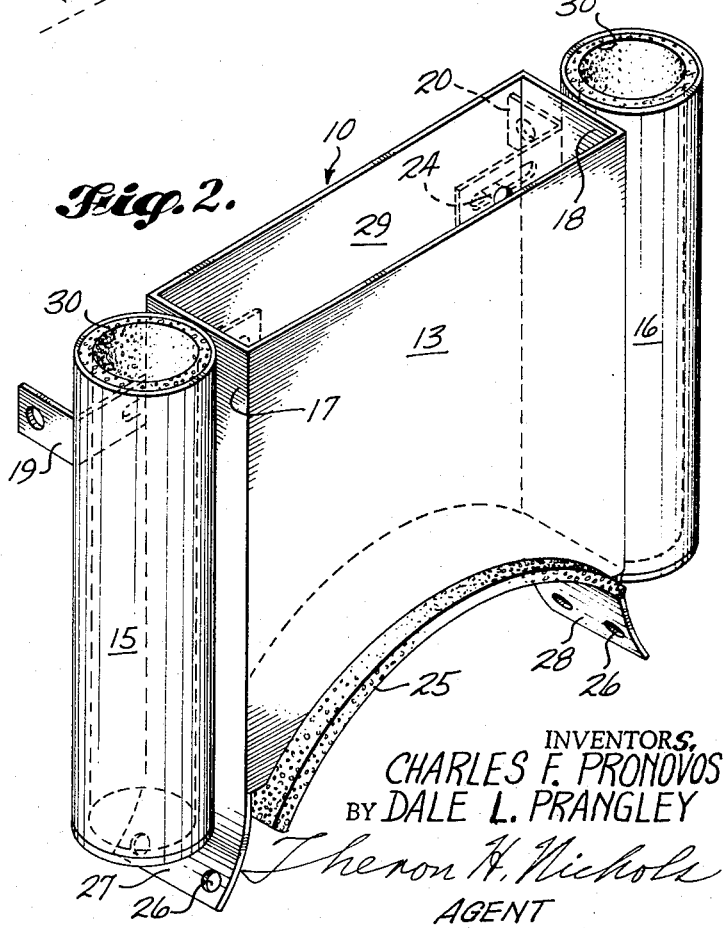
FIG. 2 is a schematic perspective view of the automobile accessory holder per se.

The automobile accessory holder, FIG. 1, comprises three basic containers, the map case 13 for holding road maps 14, or the like, with flashlight holders 15 and 16 rigidly attached to the map case sides 17 and 18, FIG. 2, as by welding when utilizing metal parts throughout. Obviously while the disclosed automobile accessory holder is illustrated as constructed of sheet metal, other suitable materials may be used if so designed for. Adjustable brackets 19 and 20 support radio transmitters, 21 and 22 and are secured to the map case 13 with a suitable fastening means as bolts 23 and 24.

FIG. 2, an enlarged isometric view of the automobile accessory holder per se, discloses more details, as the elastic pad 25 adhesively secured to the arcuate bottom of map case 13 for ensuring that the holder fits the drive shaft tunnel 12 of most automobiles. Holes 26 are formed in the lower arcuate ends 27 and 28 of map case sides 17 and 18 for receiving suitable fastening means, as bolts, for securing the automobile accessory holder to the automobile drive shaft tunnel 12.

Figure 3:
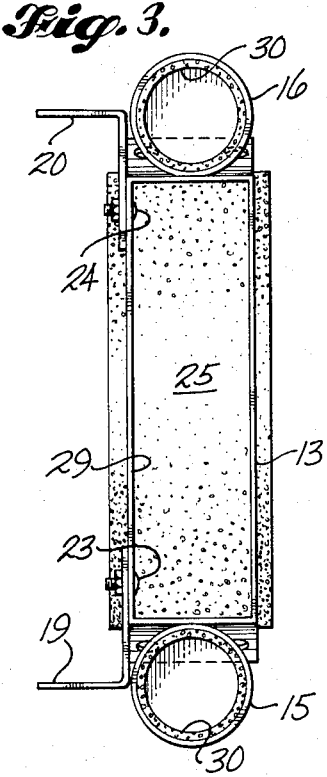
FIG. 3 is a schematic top view of the accessory holder of FIG. 2.

FIG. 3, a top view of the automobile accessory holder, as well as FIG. 2 illustrates adjustable brakets 19 and 20 for securing the radio transmitters, 21, 22, or the like, to the wall 29 of the holder. Likewise, sound insulation and padding 30 is illustrated in each of the flashlight holders 15 and 16.

Thus it will be seen that the above described automobile accessory holder is constructed in a manner which meets each of the objects set forth hereinbefore.

While only one embodiment of the invention has been shown in the accompanying specification and drawings, it will be evident that various other modifications are possible in the arrangement and construction of the disclosed automobile accessory holder without departing from the scope of the invention and it is accordingly desired to comprehend within the purview of this invention such modifications as may be considered to fall within the scope of the appended claims.

We claim:

1. An accessory holder for an automobile having a drive shaft tunnel surface comprising,
    a. a four-sided upright container for holding automobile accessories,
    b. an arcuate bottom formed on said container for fittingly snugly over said drive shaft tunnel surface,
    c. said four-sided upright container has two arcuate tabs on the lower ends of two opposite sides of said container,
    d. said arcuate tabs being parallel to the surface of said drive shaft tunnel for being attachable thereto,
    e. said four-sided upright container has two upright tubes,
    f. said upright tubes being secured to two opposite sides of said container for holding and storing elongated articles,
    g. adjustable brackets are mounted on one side of said adjustable upright container, and
    h. at least one radio transmitter is supported by said adjustable brackets and connected to the automobile for forming an efficient, compact automobile accessory holder.
2. An accessory holder as recited in claim 1 wherein,
    a. said arcuate bottom has a pad secured thereto to ensure proper fitting thereof to the tunnels of most automobiles.
3. An accessory holder as recited in claim 2 wherein,
    a. said upright tubes have padding on the internal peripheral walls for protecting the elongated articles therein.

* * * * *